United States Patent [19]
Morita

[11] Patent Number: 5,469,563
[45] Date of Patent: Nov. 21, 1995

[54] METHOD AND CONTROL APPARATUS FOR SELF DIAGNOSIS

[75] Inventor: Shinya Morita, Kanagawa, Japan

[73] Assignee: Sony Corporation, Tokyo, Japan

[21] Appl. No.: 101,198

[22] Filed: Aug. 3, 1993

[30] Foreign Application Priority Data

Aug. 3, 1992 [JP] Japan ................... 4-224522

[51] Int. Cl.$^6$ ................................... G06F 11/34
[52] U.S. Cl. .............. 395/183.01; 364/267; 364/DIG. 1; 379/1; 395/183.06
[58] Field of Search ................... 371/15.1, 25.1, 371/26; 364/267, 267.4, 267.8; 379/1; 355/203; 340/853.2; 395/575

[56] References Cited

U.S. PATENT DOCUMENTS

| | | |
|---|---|---|
| 4,814,969 | 3/1989 | Kiyooka . |
| 4,931,963 | 6/1990 | Kimura et al. . |
| 5,130,936 | 7/1992 | Sheppard et al. . |

FOREIGN PATENT DOCUMENTS

| | | |
|---|---|---|
| 0207175 | 1/1987 | European Pat. Off. . |
| 0476680 | 3/1992 | European Pat. Off. . |
| 2580091 | 10/1986 | France . |
| 598012 | 1/1984 | Japan .............. G05B 23/02 |
| 184952 | 10/1984 | Japan .............. G06F 11/12 |
| 251860 | 11/1987 | Japan . |
| 211133 | 8/1989 | Japan .............. G05B 23/02 |

OTHER PUBLICATIONS

SMPTE Journal, vol. 93, No. 2, Feb. 1984, USA pp. 149–154 M. G. Rose 7 G. Warren 'Diagnostics for a Microprocessor–Based Videotape Recorder'.

Primary Examiner—Robert W. Beausoliel, Jr.
Assistant Examiner—Albert Décady
Attorney, Agent, or Firm—William S. Frommer; Alvin Sinderbrand

[57] ABSTRACT

A self diagnosis method and control apparatus for positive self diagnosis of equipment having complicatedly interlaced mechanical portions. Equipment under diagnosis is divided into a plurality of areas under diagnosis, each of which is assigned an evaluation variable. Diagnosis is executed in units of diagnostic steps classified for each area under diagnosis. Based on an execution result, points are allotted to the evaluation variable. Based on the evaluation variable, or a sum of allotted points, each area under diagnosis is diagnosed and a diagnostic result is displayed for self diagnosis. Meanwhile, those diagnostic steps which are determined invalid by an execution result of another diagnostic step will not be executed. The equipment under diagnosis includes those which contain mechanical portions.

20 Claims, 11 Drawing Sheets

FIG. 4

AREA No.

| | | |
|---|---|---|
| 10 | proc_all | (SIGNAL PROCESSING SYSTEM) |
| 11 | PIF | DATA INPUT/OUTPUT BOARD |
| 12 | PR(1) | DIGITAL SIGNAL PROCESSING (1) BOARD |
| 13 | PR(2) | DIGITAL SIGNAL PROCESSING (2) BOARD |
| 14 | PR(3) | DIGITAL SIGNAL PROCESSING (3) BOARD |
| 15 | PR(4) | DIGITAL SIGNAL PROCESSING (4) BOARD |
| 16 | RF_REC | RF RECORDING SYSTEM |
| 17 | RF_PB | RF PLAYBACK SYSTEM |
| 20 | AE_all | (AUDIO SIGNAL PROCESSING SYSTEM) |
| 21 | ID | AUDIO SIGNAL ID RECORD/PLAYBACK SYSTEM |
| 22 | AE | AUDIO SIGNAL RECORD/PLAYBACK SYSTEM |
| 23 | ERASE | ERASE SYSTEM |
| 30 | cont_all | (CONTROL SYSTEM) |
| 31 | SSP | CPU BOARD |
| 32 | MD | MOTOR DRIVE BOARD |
| 33 | IF | REMOTE INPUT/OUTPUT BOARD |
| 34 | DM | DATA MODULE BOARD |
| 35 | CP | CONTROL PANEL |
| 40 | path_all | (TAPE TRAVEL SYSTEM) |
| 41 | Drum | ROTARY HEAD SYSTEM |
| 42 | S_Reel | SUPPLY REEL MOTOR SYSTEM |
| 43 | T_Reel | TAKE-UP REEL MOTOR SYSTEM |
| 44 | Capstam | CAPSTAN MOTOR SYSTEM |
| 45 | Tension | TENSION CONTROL SYSTEM |
| 50 | load_all | (LOADING SYSTEM) |
| 51 | Thread | THREAD SYSTEM |
| 52 | CassCon | CASSETTE COMPARTMENT SYSTEM |
| 53 | R_Shift | REEL SHIFT SYSTEM |
| 54 | Shield | SHIELD BOARD UP/DOWN SYSTEM |
| 55 | Sensor | SENSORS |
| 80 | misc | (MISCELLANEOUS) |
| 81 | PS | POWER SUPPLY |
| 82 | FAN | COOLING FAN |
| 83 | mother 1 | MAIN MOTHER BOARD |
| 84 | mother 2 | SUB MOTHER BOARD |
| 85 | data_in | DATA INPUT |
| 86 | data_out | DATA OUTPUT |
| 87 | remote | REMOTE INPUT/OUTPUT |
| 89 | tape | CASSETTE TAPE |
| 90 | overall | (OVERALL OPERATION) |
| 91 | EE_all | |
| 92 | PB_all | |
| 93 | REC_all | |

FIG. 5

(1) TURN ON POWER AND REMOVE UNNECESSARY CONNECTIONS AND TAPE.

↓

(2) SELECT A DESIRED MODE ON THE CONTROL PANEL (OR FROM THE REMOTE CONTROL). (NORMALLY, SELECT "ALL".)

↓

(3) IF A SPECIFIC AREA ALONE IS TO BE DIAGNOSED, ENTER THAT AREA. (NORMALLY, SELECT "ALL".)

↓

(4) START THE SELF DIAGNOSTIC MODE.

↓

(5) FOLLOW AN INSTRUCTION TO LOAD A SPECIFIC TAPE AS REQUIRED.

↓

(6) WHEN THE DIAGNOSIS HAS BEEN COMPLETED, READ A RESULT MESSAGE BY OPERATING THE RESULT DISPLAY MENU ON THE CONTROL PANEL.

↓

(7) IF THE MESSAGE TELLS AN ABNORMAL CONDITION, MAKE TROUBLESHOOTING ACCORDINGLY AND PERFORM THE DIAGNOSIS ALL OVER AGAIN.

↓

(8) IF NO ABNORMAL CONDITION PERSISTS, END THE DIAGNOSIS.

FIG. 6A

[START]

(1) (NORMAL OPERATING STATE)

(2) SET SELF DIAGNOSTIC ?   YES → OBTAIN MODE AND AREA REQUESTS.

(3) START SELF DIAGNOSIS ?   NO →

(4) MODE/AREA SETTING OK ?   NO →

SELF DIAGNOSIS MODE STARTS.

(5) OBTAIN, FROM MODE AND AREA, THE NUMBER OF THE STEP TO BE EXECUTED.

← ———————— IF RESET BY PROCEDURE (18).

(6) OBTAIN THE NUMBER OF THE STEP TO BE EXECUTED NEXT.

(7) END ?   YES → GO TO (*1).

(8) THE STEP ATTACHED WITH INVALID FLAG ?   YES →

(9) EXCHANGE TAPES ?   NO →

(10) TAPE EXCHANGE IS DISPLAYED. WAIT UNTIL THE CORRECT TAPE IS LOADED.

(11) EXECUTE THE STEP ACCORDING TO THE CONTENTS OF TABLE 2.

(12) ERROR OCCURRED ?   NO →

(13) INVALID ERROR ?   YES →

(14) FATAL ERROR ?   YES → GO TO (*1).

(15) MANIPULATE THE GRADE VALUE OF CORRESPONDING AREA ACCORDING TO ERROR CONTENTS.

(16) RESULT OF THE LAST STEP VALID ?  NO →

(STORE THE RESULT.)

(17) IF THE RESULT IS NO GOOD, POINTS ARE ADDED TO THE GRADE OF THE CORRESPONDING AREA IN THE TABLE OF FIG. 7. IF POINTS HAVE BEEN ALLOTTED TO OTHER AREAS, THEY ARE ADDED TOO. NECESSARY INFORMATION IS WRITTEN TO THE TABLE OF FIG. 8. IF THE STEP FLAGGED INVALID HAS ALREADY BEEN EXECUTED, POINTS ADDED BY THAT EXECUTION ARE SUBTRACTED FROM THE AREA. NECESSARY INFORMATION IS WRITTEN TO TABLE OF FIG. 10.

(18) HARDWARE RESET IS PERFORMED AS REQUIRED.

(6)

(*1) END

(20) RESULTS (TABLE 4) ARE DISPLAYED IN THE ORDER OF THEIR GREATER NUMBER OF POINTS ALLOTTED. PROVIDED THAT, HOWEVER, NO AREA HAVING POINTS LESS THAN PREDETERMINED VALUE IS DISPLAYED.

(21) ON THE KEYBOARD, CLEAR THE COLLECTED INFORMATION.

(22) [END]

FIG. 6

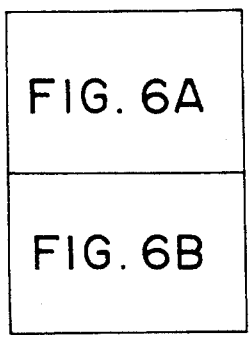

| FIG. 6A |
| FIG. 6B |

FIG. 7

| MODE | 1 | 2 | 3 | 4 | TOTAL NUMBER OF STEPS |
|---|---|---|---|---|---|
| TOTAL NUMBER OF STEPS | 30 | 20 | 1 | 5 | |
| AREA (11) (PIF) | 1 | 3 4 | | | 3 ← (*1) |
| AREA (12) (PR(1)) | 1 2 | | | 5 6 | 4 |
| AREA (13) (PR(2)) | 7 8 | | | 9 10 | 4 |
| | | | | | |
| | | | | | |

| STEP No. | (a) | (b) | (c) |
|---|---|---|---|
| 1 | 0 | | |
| 2 | 1 | 0 | |
| 3 | 1 | 1 | |
| 4 | 1 | 0 | |
| 5 | 0 | | 3 |
| 6 | 1 | 1 | |
| | | | |
| | | | |
| | | | |

NOT EXECUTED.

FOUND OK.

FOUND NO GOOD.

DETERMINED MEANINGLESS FROM THE RESULT OF STEP 3.

FIG. 9

| STEP No. | CONTENT DESCRIPTION CHARACTER STRING | EXECUTION PROGRAM ADDRESS | POINT ALLOTMENT PROGRAM ADDRESS |
|---|---|---|---|
| 1 | PIF board PIO R/W check | xxxx | xxxx |
| 2 | PR(x) PIO r/w check | xxxx | xxxx |
| 3 | PIF read data check | xxxx | xxxx |
| 4 | | | |

FIG. 10

| | GRADE | STEPS & MESSAGES | |
|---|---|---|---|
| AREA 11 (PIF) | 45 | 1-100, 3-0, 4-52 | (X) |
| AREA 12 (PR(1)) | 0 | | |
| AREA 13 (PR(2)) | 5 | 10-120 | |
| | | | |
| AREA 81 (power supply) | 0 | | (Y) |
| AREA 82 (cooling fan) | 0 | | |
| AREA 83 (main mother) | 0 | | |
| AREA 83 (sub mother) | 0 | | |
| AREA 91 (EE_all) | ---- | | (Z) |
| AREA 92 (PB_all) | ---- | | |
| AREA 93 (REC_all) | ---- | | |
| AREA 93 (sub mother) | ---- | | |

FIG. 11

| MESSAGE No. | MESSAGE |
|---|---|
| 1 | PIF board may be defective |
| 2 | RF-REC block may be defective |
| 3 | Thread block may be defective |
| 4 | PB error rate is too high |
| 5 | |
| . | |
| . | |
| . | |

FIG. 12

| SENSOR No. | 1 | 2 | 3 | 4 | | | | |
|---|---|---|---|---|---|---|---|---|
| RELIABILITY | | | 1 | | | | | |

METHOD AND CONTROL APPARATUS FOR SELF DIAGNOSIS

BACKGROUND OF THE INVENTION

1. Field of the Invention

The present invention relates to a method and a control apparatus for self diagnosis and, more particularly, to a method and a control apparatus for self diagnosis suitable for use in such information processing apparatus as a data recorder having a mechanical portion.

2. Description of the Prior Art

It is known that some information processing, instrumentation, or control apparatus or systems have a self diagnostic capability. The self diagnostic capability of a data recorder, for example, includes an initial test to be performed when the data recorder is powered on, error indication, alarming, and error data storage in a regular operation, and various tests in a maintenance operation, among others.

Self diagnosis as generally referred to points at the diagnostic operations to be performed in the regular run of the apparatus as mentioned above, with emphasis placed on error detection. It sometimes can happen that one of the apparatus's functional portions which is used only once in a long while, one year for example, is found defective just before use. With a conventional data recorder, for example, it is a general practice to provide no capability of checking the entire recorder system including its infrequently used functional portion for a failure or no dedicated self diagnostic mode. However, in the field of instrumentation, some of apparatus including an oscilloscope are beginning to employ the capability for self-diagnosing their electric or electronic circuitry.

However, a limitation with the above-mentioned practice as performed on some instruments is that self diagnosis is adapted to apply only to electric or electronic portions of each instrument. Therefore, the practice cannot apply to any apparatus that contain mechanical portions to be subjected to self diagnosis. Such apparatus include a data recorder comprising a video tape recorder, for example.

Unlike an electric or electronic circuit, a mechanical portion of an apparatus cannot be definitely defined in terms of input and output. With the electric or electronic circuit, it is general practice to enter a test signal in it and observe a resultant output for diagnosis. Mechanically, it is not that simple; diagnosis must often be performed on multiple complicatedly interlaced portions.

At a laboratory level, a troubleshooting expert system is under development for inferring from a symptom a failing location based on an artificial intelligence (AI) approach. Implementing such expert system requires the use of a powerful computer system such as a workstation. Such implementation is unrealistic in terms of cost for the present invention which intends to incorporate the self diagnostic capability in an apparatus. In addition, the construction of an expert system requires a large-scale database on which inference must be made from a symptom as wisely as a human expert. However, it is often difficult to prepare and install such a database on an apparatus under fabrication in which a self diagnostic capability is incorporated.

Thus, for the self diagnosis of such apparatus as a data recorder, a system must be constructed which, still supporting a conventional diagnostic capability for error detection, provides a positive troubleshooting capability such as a dedicated self diagnostic mode. Further, the above-mentioned diagnostic system must be able to cope with such a complicated symptomatic situation for diagnosing a mechanical portion of the apparatus as that, while checking portion A, an abnormal condition has been unexpectedly detected in portion B. It is also desirable for the built-in diagnostic system to be implemented by a simple approach rather than complicated one typically supported by AI.

OBJECTS AND SUMMARY OF THE INVENTION

It is therefore an object of the present invention to provide a simple self diagnostic method which can positively self-diagnose apparatus having complicatedly interlaced mechanical portions, and a controller for implementing the self diagnostic method.

In carrying out the invention and according to one aspect thereof, there is provided a self diagnostic method comprising the steps of dividing an apparatus under diagnosis into two or more areas subject to diagnosis, providing each of the areas with an evaluation variable, performing diagnosis in units of diagnostic steps classified by the area, allotting points to the evaluation variable of each area under diagnosis associated with the executed diagnostic step according to an execution result, and diagnosing each area based on a value of the evaluation variable obtained by adding up the allotted points.

When executing a diagnostic operation, it is arranged so that no step determined invalid by an execution result of another diagnostic step will be executed and an apparatus under diagnosis includes apparatus having a mechanical portion.

In carrying out the invention and according to another aspect thereof, there is provided a controller 100 as schematically shown in FIG. 13 comprising diagnosis execution control means 110, execution result processing means 120, and diagnostic result display means 130, wherein diagnosis is performed on a specified area 201 of an apparatus under diagnosis divided into multiple areas under diagnosis each provided with an evaluation variable, and a diagnostic result is determined upon receiving an execution result. Actually, as shown in FIG. 13, there is provided, between the controller 100 and the specified area 201, diagnosis executing means for executing diagnosis based on an instruction given by the diagnosis execution control means 110 and detecting the execution result to send it to the execution result processing means 120. However, the description of this diagnosis executing means is omitted herein because its specific configuration and implementation technique do not matter in carrying out the present invention.

The diagnosis execution means 110 has a diagnostic step specification capability 111 and executes diagnosis by specifying a diagnostic step for each area of the apparatus under diagnosis 200 and, further, for each diagnostic mode. In execution, it is arranged so that a determination by an invalid step decision capability 122 in the execution result processing means 120 is referenced not to execute diagnostic step determined invalid by an execution result of another step. The invalid step includes those steps which are determined invalid by sensor reliability data 123 obtained from the execution result of each step carried out by the execution result processing means 120 for example.

The execution result processing means 120 has an evaluation variable point allotting capability 121 to allot points to the evaluation variable of an associated area under diagnosis based on the execution result of each step and store a diagnostic result consisting of and integrated value of evaluation variables (124). In this operation, if a step determined invalid by the decision of the invalid step decision capability 122 has already been executed, the evaluation variable point allotting capability 121 subtracts the allotted points from the associated area under diagnosis.

The diagnostic result display means 130 displays the diagnostic result obtained by the execution result processing means 120, starting with an area having a greatest evaluation variable. It also has display limit capability 131 for displaying only areas having evaluation variables above a certain level which can be varied.

BRIEF DESCRIPTION OF THE DRAWINGS

FIG. 4 illustrates an example of how an apparatus under diagnosis is divided into areas under diagnosis;

FIG. 5 illustrates how to operate self diagnostic modes;

FIG. 6–B is an overall flowchart illustrating self diagnostic mode operations;

FIG. 7 is a table for determining, from modes and areas under diagnosis, which diagnostic step is to be executed;

FIG. 8 is a table in which an execution result of each diagnostic step is entered;

FIG. 9 is a table for determining an address of a diagnostic step execution program and an address of a point allotment calculation program from an internal diagnostic step number;

FIG. 10 is a table in which a grade for each area under diagnosis is stored;

FIG. 11 is a table from which a message is obtained according to a message number;

FIG. 12 is a table for managing sensor output reliability; and;

DESCRIPTION OF THE PREFERRED EMBODIMENT

A self diagnosis method and its controller practiced as a preferred embodiment of this invention as applied to a data recorder will be described in detail by way of example with reference to the accompanying drawings.

Figure 1:
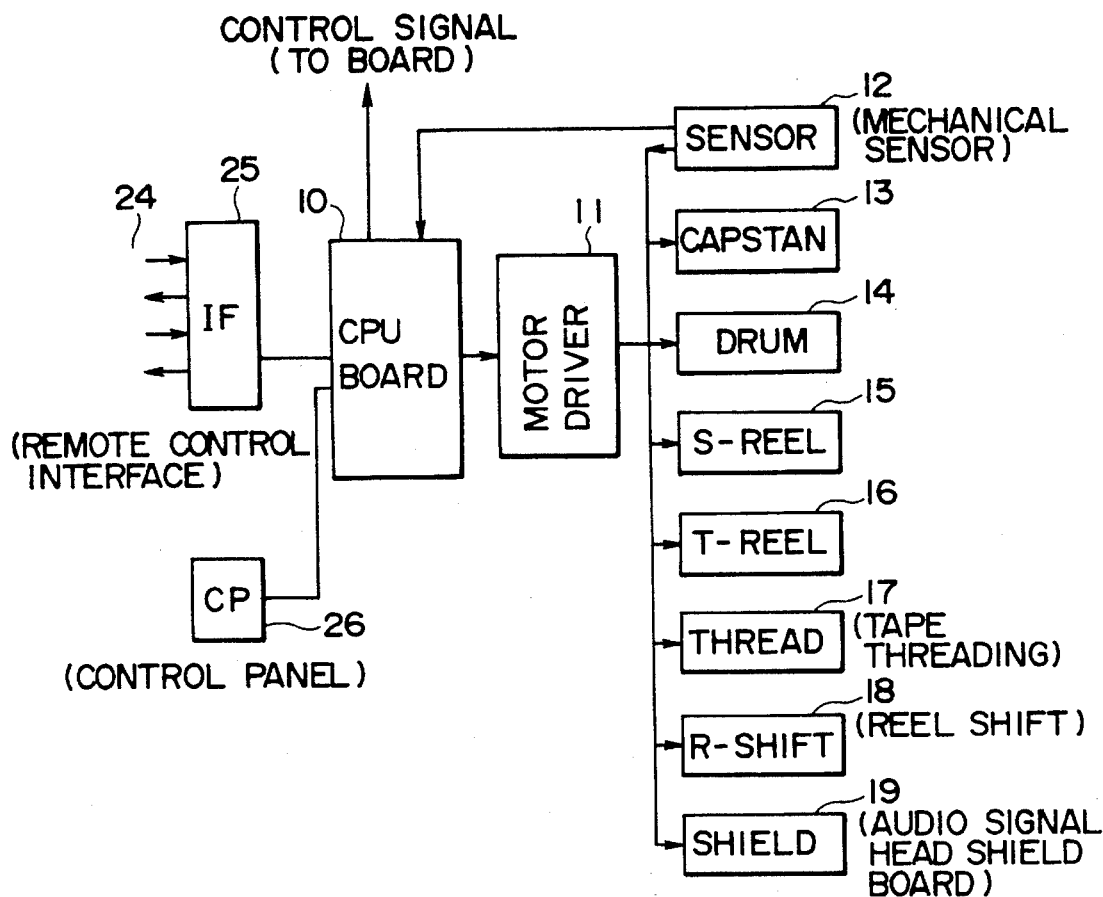
FIG. 1 is a block diagram illustrating an entire configuration of the data recorder according to the present invention.

FIG. 1 is the block diagram illustrating the entire configuration of the data recorder practiced as the preferred embodiment of this invention. In the figure, each block does not indicate an actual board configuration; it indicates a functional block for self diagnosis, or an area under diagnosis.

Reference numeral 1 indicates data input/output interface which provides synchronization in data between a digital signal processor 2 and data I/O 20 and 21 of the data recorder. The digital signal processor 2 performs concurrent processing in four units for example to increase processing speed.

Digital data 20 entered is fed through the data input/output interface 1 to the digital signal processor 2 to be added with an error correction code. A resultant signal is fed to an RF-REC (record) system 3 to be recording-compensated for recording by a rotary head 4. In reproduction, this operational flow is reversed; however, instead of the RF-REC 3, an RF-PB (playback) system 5 is used.

A CPU board 10 is a CPU functional portion which controls the data recorder in its entirety. An outside remote control signal 24 including a self diagnosis start instruction and an inquiry for a diagnostic result is entered in the CPU board 10 through an interface board 25. A CP 26 is a control panel consisting of a keyboard and a display.

A mechanical sensor 12 represents all sensors installed in a tape travel system and a cassette compartment. Many of these sensors are optical sensors based on pairs of a light emitting diodes and phototransistors. A signal coming from the sensor 12 is processed by the CPU board 10 to be fed to a motor driver 11 as a control signal, driving motors and plungers for operating mechanical portions 13 through 19 of the tape travel system and the like shown.

Figure 2:
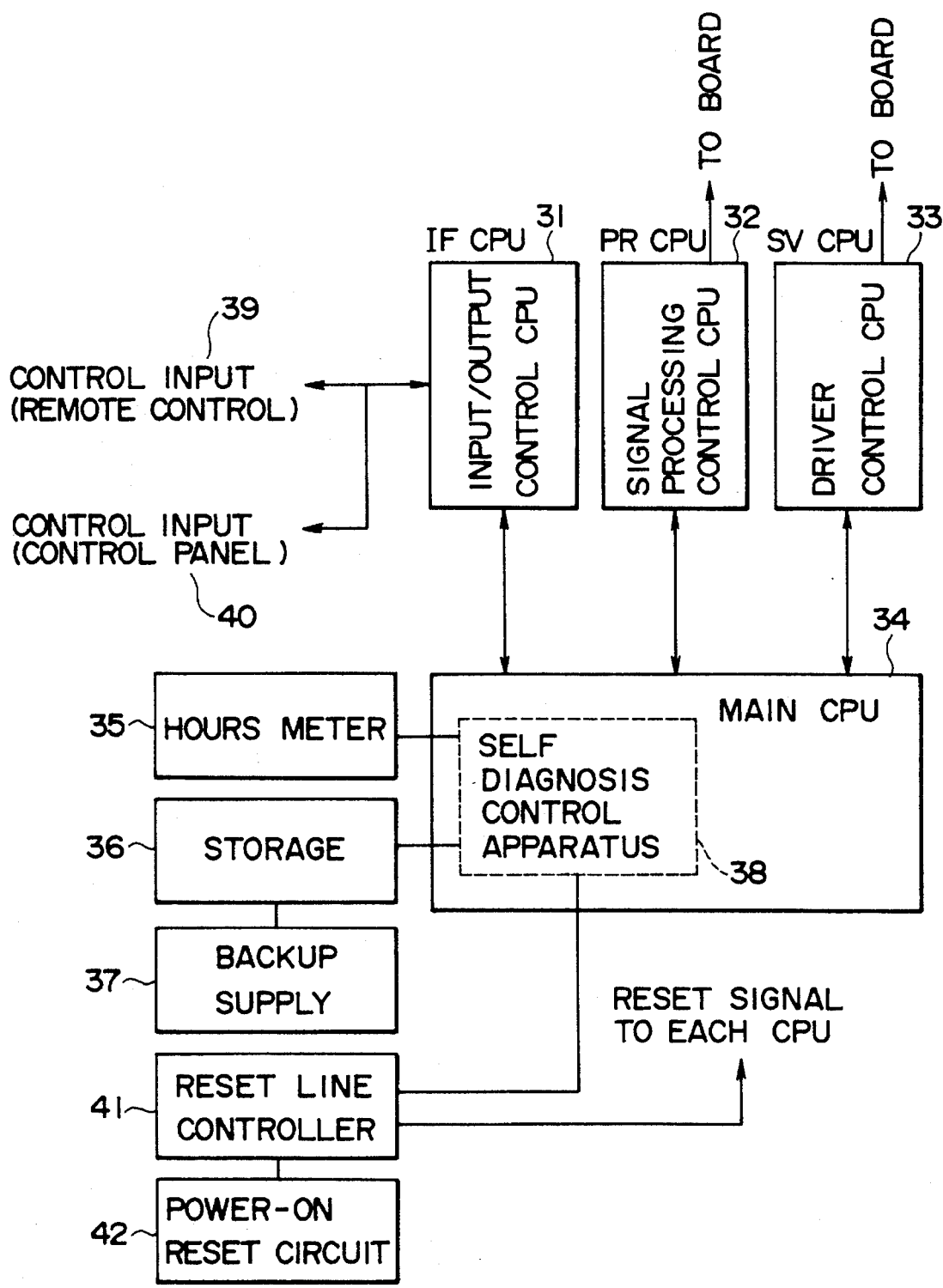
FIG. 2 is a block diagram illustrating an internal configuration of a CPU board 10 of FIG. 1.

FIG. 2 is the block diagram illustrating an internal configuration of the CPU board 10. It contains a main CPU 34 and three sub CPUs; IF CPU 31 for input/output control, PR CPU 32 for signal processing control, and SV CPU 33 for driver control. Controlled by the main CPU 34, each sub CPU in turn controls a corresponding portion to perform a data recorder operation.

The main CPU 34 also executes a self diagnostic sequence and contains a self diagnosis controller 38 for that purpose. The main CPU 34 is also provided with a storage unit 36 for storing a self diagnostic result and a data recorder state to be referenced before starting self diagnosis, a backup power supply for the storage unit 36, a reset line controller 41 for hardware-resetting the main CPU itself upon termination of the self diagnosis, and a power-on reset circuit 42 for controlling a reset operation at power-on.

In what follows, the self diagnosis method according to the invention and capabilities necessary for implementing it will be described.

Figure 3:
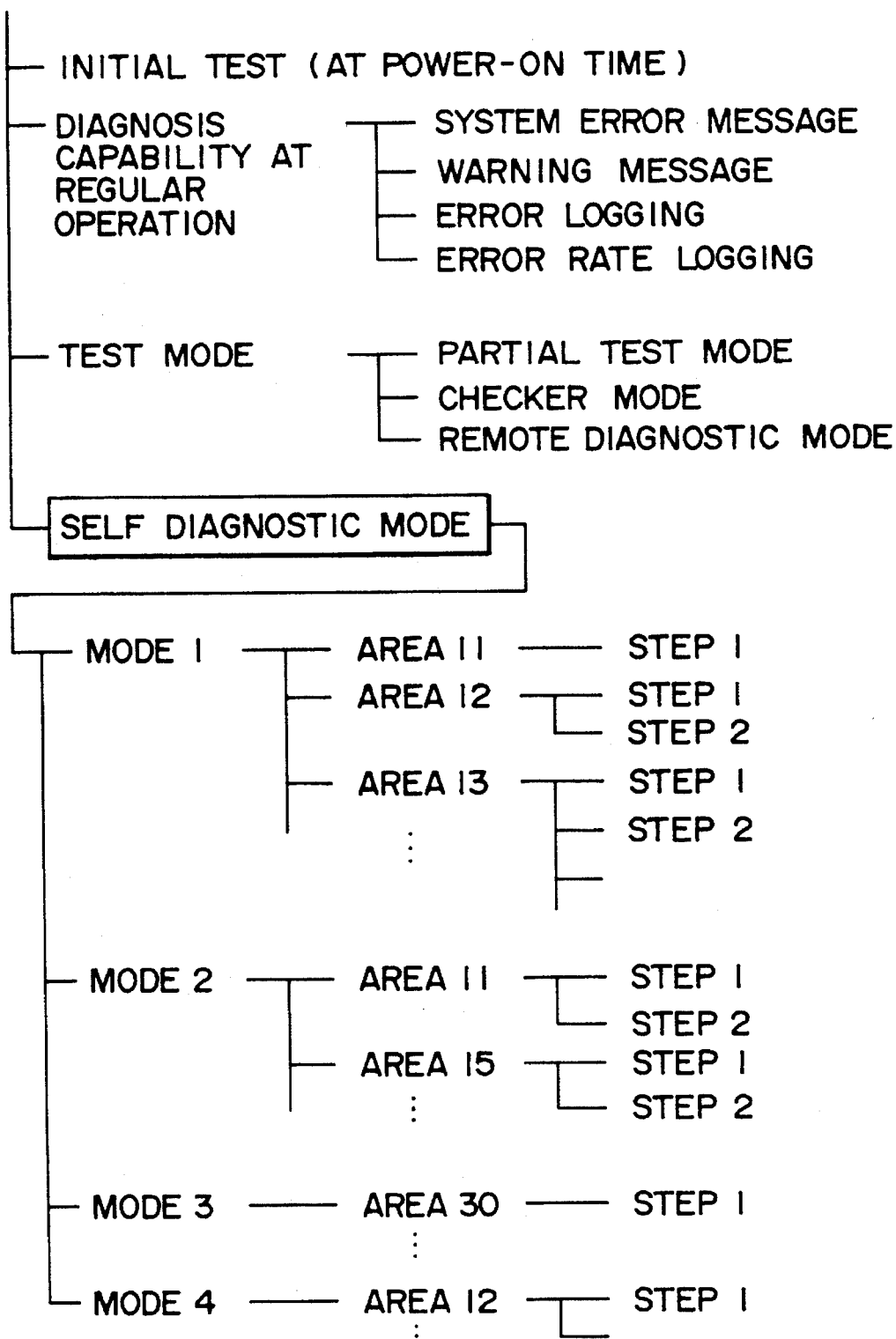
FIG. 3 illustrates positions of self diagnostic modes in the present invention.
Figure 13:
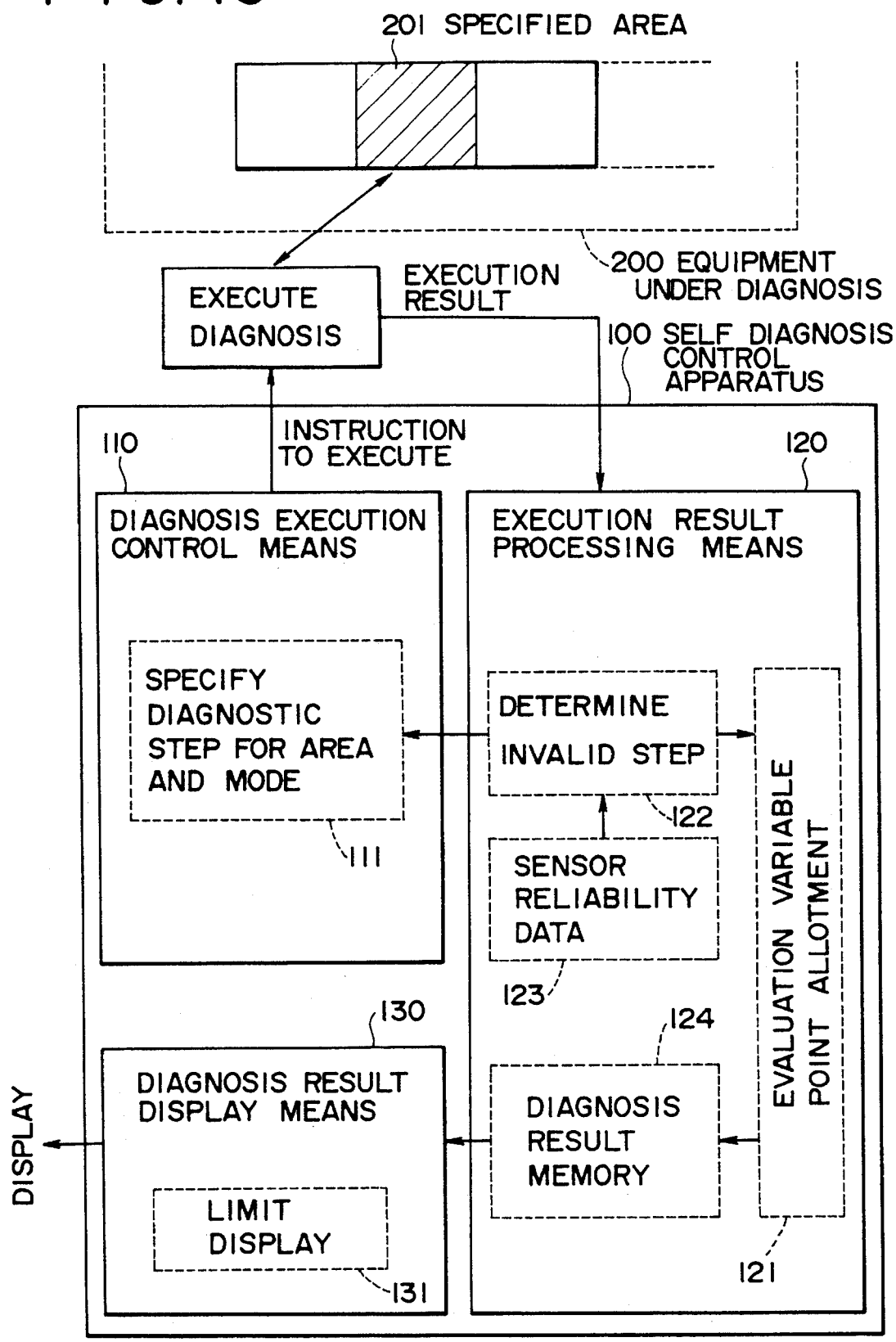
FIG. 13 is a block diagram schematically illustrating the self diagnosis controller according to the present invention.

First, the position of the self diagnosis mode according to the invention is described. As shown in FIG. 3 and as described above, the data recorder is provided with various self diagnostic capabilities including an initial test, a regular operation diagnostic capability, a test mode, and the self diagnosis mode positioned as a dedicated self diagnostic mode. The dedicated self diagnostic mode as referred to herein is a capability to be intentionally activated for checking the data recorder for any abnormal conditions. For example, this mode is activated, upon switching on the data recorder for starting a task, to check the data recorder for any trouble or troubleshoot the data recorder when it is found malfunctioning. Once in the self diagnostic mode, no regular operations including data recording/reproducing can be performed.

In the self diagnostic mode, the data recorder is divided into multiple areas to be subjected to diagnosis (FIG. 4). The self diagnostic mode comprises following four modes which respectively cover the areas under diagnosis. In mode 1, diagnosis is performed with no tape cassette loaded as with an independent reel rotational test. In mode 2, diagnosis is performed with an electric system calibration tape loaded as with a reproduction of a test signal tape. In mode 3, diagnosis is performed with a mechanical calibration tape loaded as with a tracking test and a head position control test. In mode 4, diagnosis is performed with a blank tape loaded to check whether recording is made normally or not. One or more diagnostic steps (FIG. 9) are allocated as required to each area to be diagnosed in each mode and for execution.

It should be noted that the present embodiment can also be constituted so that self diagnosis is performed while a regular operation such as data recording/reproducing operation is in progress.

Now, referring to FIG. 4, the data recorder is divided into areas under diagnosis by way of example. To be specific, the data recorder is divided into seven divisions of a signal processing system, an audio signal processing system, a control system, a tape travel system, a tape loading system, a miscellaneous system, and an overall system. Each division is further divided into multiple functional blocks or areas suitable for particular diagnoses. Each area under diagnosis is assigned with an area number.

It should be noted that the areas in the miscellaneous division having area numbers on the order of 80 cannot be tested alone and the areas in the overall division having area numbers on the order of 90 have no specific object to be diagnosed. With the areas having numbers on the order of 90, the data recorder is operated in the same manner as a regular operation to make an overall diagnosis based on status variables such as voltages and on errors detected.

Operations of the self diagnostic mode and an operational flow of diagnosis will be described as follows. FIG. 5 indicates how to operate the self diagnostic mode, in which the mode is executed following procedures (1) through (8). In procedure (4), a self diagnosis starts. In procedure (5), diagnostic tapes are exchanged for changing modes as instructed by a diagnostic program halfway in its execution. FIG. 6 is an overall flow of the self diagnosis indicating the self diagnostic operations. In what follows, these self diagnostic operations will be described by referring to the overall flow.

First, in procedures (1) and (2), preparations necessary for carrying out the self diagnosis are made and desired self diagnostic mode and area under diagnosis are entered through the control panel or a remote control device. At this stage, the entered mode and area are only stored in the storage unit and therefore the mode is not yet active. When the self diagnostic mode is activated according to procedure (4) shown in FIG. 5, the self diagnosis starts following procedures (3) through (5) shown in FIG. 6.

Each diagnostic step, in procedure (6), obtains the number of a step to be executed next from a current setting by referring to ROM data in which diagnostic steps to be executed for each mode have been set for each area as shown in FIG. 7. Meanwhile, in procedure (8), contents of RAM in which execution results of diagnostic steps are stored as shown in FIG. 8 are referred to so that, if a specific diagnostic step is found to have already been executed, the step will not be executed, or if a diagnostic step to be executed next based on the result of another diagnostic step is found invalid, the step will not be executed, thereby passing control to a next diagnostic step.

Especially, if the output of a sensor is found unreliable by the result of a diagnostic step for example, the execution results of the diagnostic steps associated with the sensor output will subsequently be handled as being unreliable. Consequently, a table listing the reliability data of each sensor is prepared beforehand as shown in FIG. 12. The table is referred to every time a diagnostic step is to be executed to determine whether the step is valid or invalid.

When changing a diagnostic mode to another, if a diagnostic tape need be changed to another, a current tape is ejected and a required tape is inserted, a tape exchange event is displayed, and the operational flow is held until the tape has been fully loaded as in procedures (9) and (10). Each step is executed by obtaining an address of a program to be executed from its step number based on the ROM data which specifies the preset execution contents of each step as shown in FIG. 9.

If a so-called system error occurs during execution of a diagnostic step, the error will be handled as follows in procedures (12) through (15). The system error is one of the following four types: (1) an error whose occurrence is self evident from the nature of self diagnosis and which may be ignored; (2) an error whose occurrence is expected and its presence or absence is positively used for self diagnosis; (3) an unexpected error which is useful for self diagnosis and allows it to proceed; and (4) an unexpected error which does not allow self diagnosis to proceed.

This error handling is performed in each diagnostic step, in which a type of detected error is determined to perform necessary processing accordingly. That is, the error of type (1) mentioned above is ignored in procedure (13), the error of type (4) causes the diagnosis to terminate in procedure (14), and the errors of types (2) and (3) add up a grade value of an suspected area under diagnosis depending on their contents in procedure (15). The grade (or an evaluation value, also called an evaluation variable herein) as used herein indicates a degree of failure in an associated area under diagnosis. Its value is stored for each area under diagnosis and may be 0 to 255. This value increments in units of 1 to 10 depending on an execution result of each step. As this value increases, it is more probable that the area under diagnosis is failing.

When a diagnostic step has terminated in procedure (17), the grade value for an area under diagnosis associated with that diagnostic step is manipulated; that is, point allotment is performed. Points are allotted by a point allotting program preset for each diagnostic step. As shown in FIG. 9, an address of each point allotting program can be referenced in ROM which relates a step number with a diagnosis execution program. For example, if executing a diagnostic step to test area 22 results in a no good condition, the grade of the area 22 is increased by 30 points. If, at this time, area 23 is also suspicious, its grade is increased by 20 points for example.

The grade value thus allotted to the area under diagnosis is stored in an execution result table (FIG. 10) to be described, along with information on the diagnostic step executed and diagnostic message. At the same time, whether a diagnostic step has been executed or not and, if executed, its result are entered in the table of FIG. 9 for each diagnostic step. If the execution result indicates that execution of another diagnostic step is meaningless, that step is flagged invalid. If the diagnostic step having an invalid flag has already been executed, it means that its execution will be meaningless, thus requiring to subtract the points allotted to the associated area from its grade value.

Some diagnostic steps forcibly change a state in the data recorder for testing. Once changed, it is often difficult to restore the original state even if the state is in memory. Therefore, if this happens, a hardware reset operation is executed in procedure (18). When specified diagnostic steps have all been executed or if it is determined that a fatal error detected in procedure (14) has made impossible the continuation of the diagnosis, the diagnosis is terminated (refer to (*1) in FIG. 6).

The diagnostic result is stored in the RAM as a grade value for each area under diagnosis as shown in FIG. 10; that is, points to be allotted as results of the execution of diagnostic steps are added up in the RAM. At the same time, a number of a diagnostic step determined failing and an associated diagnostic message are stored (steps & messages). For example, as shown in FIG. 11, all messages stored in the ROM beforehand are assigned with numbers which are stored in the RAM of FIG. 10. In FIG. 10, "1-100" indicates that step 1 is no good and message 100 must be referred to, "3-0" indicates that step 3 is no good and there is no message to be referred to, and so on.

Now, when the diagnosis has been completed, the result is displayed on the control panel starting with an area under diagnosis having a highest grade value, in a form "area xx is suspicious of failing," in procedure (20). In addition to this message, a special message informing a service engineer of the reason of failure determination may be displayed for each diagnostic step, for example.

It should be noted here that, as a general rule, no area under diagnosis having less than 16 points will be displayed. This is because, if areas under diagnosis slightly suspicious of failing are displayed in large quantities, practicality of the self diagnosis would be lost. However, the grade or the number of points may be lowered from 16 if a service engineer for example requires more detail failure information.

If an attempt is made to execute a test of the same mode twice, it is judged that a retry of the test is requested, automatically erasing previous data. The previous data may also be manually erased by an operator.

Data structures, or tables, to be referred to during execution of the above-mentioned diagnostic program will be described as follows. These tables contain two types of data; predefined data stored in the ROM and data stored in the RAM as a result of diagnostic execution.

A table of FIG. 7 is used to determine which step is to be executed based on a mode and an area under diagnosis specified on the control panel. This table is written in the ROM of the main CPU 34 beforehand. Each diagnostic step is represented in an internal step number uniquely set in the data recorder. In the table, a number or numbers indicated for each area under diagnosis are step numbers. For example, when all steps of area 11 are be checked, steps 1, 3, and 4 are executed (*1); when all steps of mode 1 are to be checked, steps 1, 2, 7, and 8 are executed (*2).

FIG. 8 is a table in which an execution result of each diagnostic step is entered. This table is created in the RAM of the main CPU 34. Entries in this table include, for each diagnostic step, whether the step has been executed or not, a result of execution, and whether the result is invalid or valid. In the table, (a) indicates whether the step has been executed or not and is 1 if executed; (b) indicates the execution result and is 0 if found good; and (c) indicates that the execution result of the step is found invalid by another step, and is the number of the invalid step.

FIG. 9 is a table for obtaining an address of a step execution program from the internal step number and an address of a grade calculation program from a step execution result. This table is also written in the ROM beforehand. In the table, "Execution program address" column contains a start address of an execution program corresponding to a specified diagnostic step and "Point allotment program address" column contains an address of the point allotment program for recalculating the grade of the diagnostic step from a result of a subsequent diagnostic step. "Content description character string" column contains information to be used when displaying the content of the specified diagnostic step on the control panel.

FIG. 10 is a table to store a grade for each area under diagnosis and is stored in the RAM. In addition to the grade, this table stores an internal number of a diagnostic step which manipulated the grade and an internal number of a message given by the step. In the figure, (X) indicates an area under diagnosis for which a program is executed as a main target; (Y) indicates an area under diagnosis circumstantially suspected of failure from a program execution result; and (Z) indicates an area under diagnosis for which an overall diagnosis is performed without specifying a particular location. It should be noted that the (Z) area under diagnosis indicates no particular area under diagnosis and therefore has no grade value. "Steps & messages" column contains the number of a failed step and a storage number (refer to FIG. 11) of an associated message. For example, "1-100" means that step 1 is no good and message number 100 must be referred to for description; "3-0" means that step 3 is no good and there is no corresponding message.

FIG. 11 is a table for obtaining a message from a message number and is also stored in the ROM beforehand.

FIG. 12 is a table for managing sensor output reliability. If a result of a diagnostic step indicates that an output of a sensor is not reliable, reliability "1" is recorded for the sensor. This table is referenced by each diagnostic step to determine whether its execution result is valid or invalid.

As described and according to the invention, actions necessary for self diagnosis are taken automatically in general, realizing faster and more accurate self diagnosis than prior-art techniques. A self diagnosis is performed by selecting from multiple diagnostic steps necessary ones. More steps executed will result in a more accurate result. If required, only a minimal number of steps may be executed for a meaningful result.

If an execution result of each diagnostic step indicates two or more suspicious areas under diagnosis, the result can be used for evaluating such areas by manipulating their grade values.

If an error has been detected during the execution of a diagnosis, manipulating the grade values of multiple associated areas under diagnosis allows to positively use the error for the diagnosis.

Further, a failure which cannot be located by a single test can be checked by using circumstantial evidence obtained by other diagnostic steps without resorting to complex inference. In addition, introduction of grade values for evaluation allows to use a test which puts out a vague result. While the preferred embodiment of the invention has been described using specific terms, such description is for illustrative purpose only, and it is to be understood that changes and variations may be made without departing from the spirit or scope of the appended claims.

What is claimed is:

1. A method of self diagnosing an apparatus having a plurality of functional areas, the method comprising the steps of:

performing a plurality of diagnostic steps on one of said functional areas of said apparatus, said one functional area having a grade value representing its functional operativeness, each of said plurality of diagnostic steps producing a respective diagnostic result;

allocating a respective point value to each said respective diagnostic result; and varying said grade value of said one functional area by said respective point value of each said respective diagnostic result.

2. The method of claim 1, wherein the step of performing a plurality of diagnostic steps includes the steps of:

storing validity data for each of said diagnostic steps based upon diagnostic results of previously performed diagnostic steps;

determining whether a respective diagnostic step to be performed is a valid step based upon the stored validity data;

performing said respective diagnostic step if it is determined to be a valid step;

determining whether other ones of said diagnostic steps are invalid steps based upon the produced diagnostic result of said performed diagnostic step; and altering said stored validity data to indicate the invalidity of said other ones of said diagnostic steps that are determined to be invalid.

3. The method of claim 2, wherein the step of performing a plurality of diagnostic steps further includes the step of adjusting said grade value in accordance with said point values of said diagnostic results of previously performed diagnostic steps that are determined to be invalid steps so as to nullify previous affects on said grade value by diagnostic steps that are determined to be invalid.

4. The method of claim 3, wherein the step of varying said grade value is carried out by increasing said grade value by said point value of said diagnostic result of each said performed diagnostic step; and said step of adjusting said grade value is carried out by reducing said grade value by said point value of said diagnostic result of each said previously performed diagnostic step that is determined to be an invalid step.

5. The method of claim 1, wherein said diagnostic steps are performed on a plurality of functional areas of said apparatus, each of said functional areas having a respective grade value representing a functional operativeness of said respective functional area.

6. The method of claim 5, further comprising the step of displaying said functional areas in order of decreasing grade values.

7. The method of claim 5, further comprising the step of displaying said functional areas having respective grade values greater than a predetermined value.

8. The method of claim 1, wherein the step of allocating a respective point value is carried out by retrieving from a memory a value corresponding to said respective result for said respective diagnostic step and assigning the retrieved value as said respective point value.

9. A diagnosis system for diagnosing an apparatus having a plurality of functional areas, the diagnosis system comprising:

means for performing a plurality of diagnostic steps on one of said functional areas of said apparatus under diagnosis, said one functional area having a grade value representing its functional operativeness, each of said plurality of diagnostic steps producing a respective diagnostic result;

means for allocating a respective point value to each said respective diagnostic result; and means for varying said grade value of said one functional area by said respective point value of each said respective diagnostic result.

10. The diagnosis system of claim 9, wherein said means for performing a plurality of diagnostic steps includes:

means for storing validity data for each of said diagnostic steps based upon diagnostic results of previously performed diagnostic steps;

means for determining whether a respective diagnostic step to be performed is a valid step based upon the stored validity data;

means for performing said respective diagnostic step if it is determined to be a valid step;

means for determining whether other ones of said diagnostic steps are invalid steps based upon the produced diagnostic result of said performed diagnostic step; and means for altering said stored validity data to indicate the invalidity of said other ones of said diagnostic steps that are determined to be invalid.

11. The diagnosis system of claim 10, wherein said means for performing a plurality of diagnostic steps further includes means for adjusting said grade value in accordance with said point values of said diagnostic results of previously performed diagnostic steps that are determined to be invalid steps so as to nullify previous affects on said grade value by diagnostic steps that are determined to be invalid.

12. The diagnosis system of claim 11, wherein said means for varying said grade value includes means for increasing said grade value by said point value of said diagnostic result of each said performed diagnostic step; and said means for adjusting said grade value includes means for reducing said grade value by said point value of said diagnostic result of each said previously performed diagnostic step that is determined to be an invalid step.

13. The diagnosis system of claim 9, wherein said means for performing a plurality of diagnostic steps is operable to perform diagnostic steps on a plurality of functional areas of said apparatus, each of said functional areas having a respective grade value representing a functional operativeness of said respective functional area.

14. The diagnosis system of claim 13, further comprising means for displaying said functional areas in order of decreasing grade values.

15. The diagnosis system of claim 13, further comprising means for displaying said functional areas having respective grade values greater than a predetermined value.

16. The diagnosis system of claim 13, further comprising means for designating said plurality of functional areas of said apparatus to be diagnosed.

17. The diagnosis system of claim 13, further comprising storage means for storing said diagnostic steps to be performed to diagnose each of said functional areas of said apparatus; and wherein said means for performing further includes means for retrieving from said storage means said diagnostic steps to be performed.

18. The diagnosis system of claim 17, wherein said apparatus is a data recording device; and said storage means stores diagnostic steps to be performed to diagnose each of said functional areas in a plurality of self diagnostic modes, said plurality of self diagnostic modes including an independent reel rotation diagnostic mode, an electric system calibration diagnostic mode, a mechanical calibration diagnostic mode, and a data recording mode.

19. The diagnosis system of claim 9, further comprising storage means for storing values representing point values for each possible diagnostic result of each of said diagnostic steps; and wherein said means for allocating a respective point value includes means for retrieving from said storage means a value corresponding to said respective result for said respective diagnostic step and means for assigning the retrieved value as said respective point value.

20. A self diagnosis control apparatus which divides an apparatus under diagnosis into a plurality of areas under diagnosis, each provided with an evaluation variable for performing a diagnosis in units of said areas under diagnosis, comprising:

(1) self diagnosis execution control means for executing the diagnosis based on diagnostic steps corresponding to said areas under diagnosis, at least some of said diagnostic steps corresponding to a plurality of said areas under diagnosis, said self diagnosis execution control means having a first storage means for storing said diagnostic steps corresponding to each of said areas under diagnosis from which specified diagnostic steps are read for execution and a storage means for storing information which tells whether any of said diagnostic steps has been executed;

(2) execution result processing means for adding up points allotted to said evaluation variable based on an execution result of each diagnostic step, said execution result processing means controlling detecting means for detecting whether there is any diagnostic step that is determined by another diagnostic step to be invalid based on its diagnostic result and said diagnosis execution control means so that no diagnostic step determined invalid based on a detection result is to be executed, wherein, if an already executed diagnostic step is determined invalid based on said detection result, no point allotted by said invalid step is added to said evaluation variable;

(3) display means for displaying a state of said apparatus under diagnosis based on a value of said evaluation variable for each of said areas; and (4) specification means for specifying said areas under diagnosis.

* * * * *